May 13, 1969  N. G. TRIBE  3,443,677
CONVEYOR SYSTEM FOR MOVING SOLIDS OVER LONG DISTANCES
Filed Oct. 30, 1967  Sheet 1 of 8
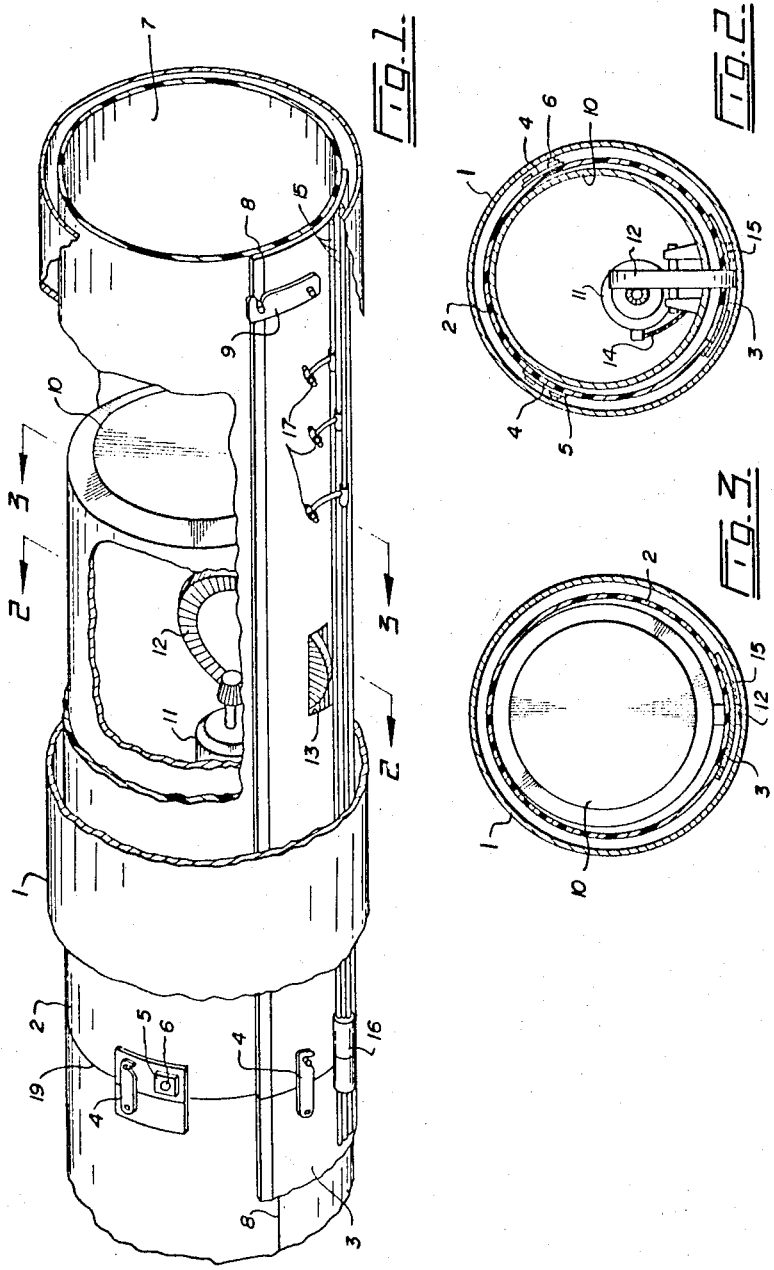
INVENTOR
NORMAN GEORGE TRIBE
BY
Christen, Sabol, O'Brien & Calbert
ATTORNEY

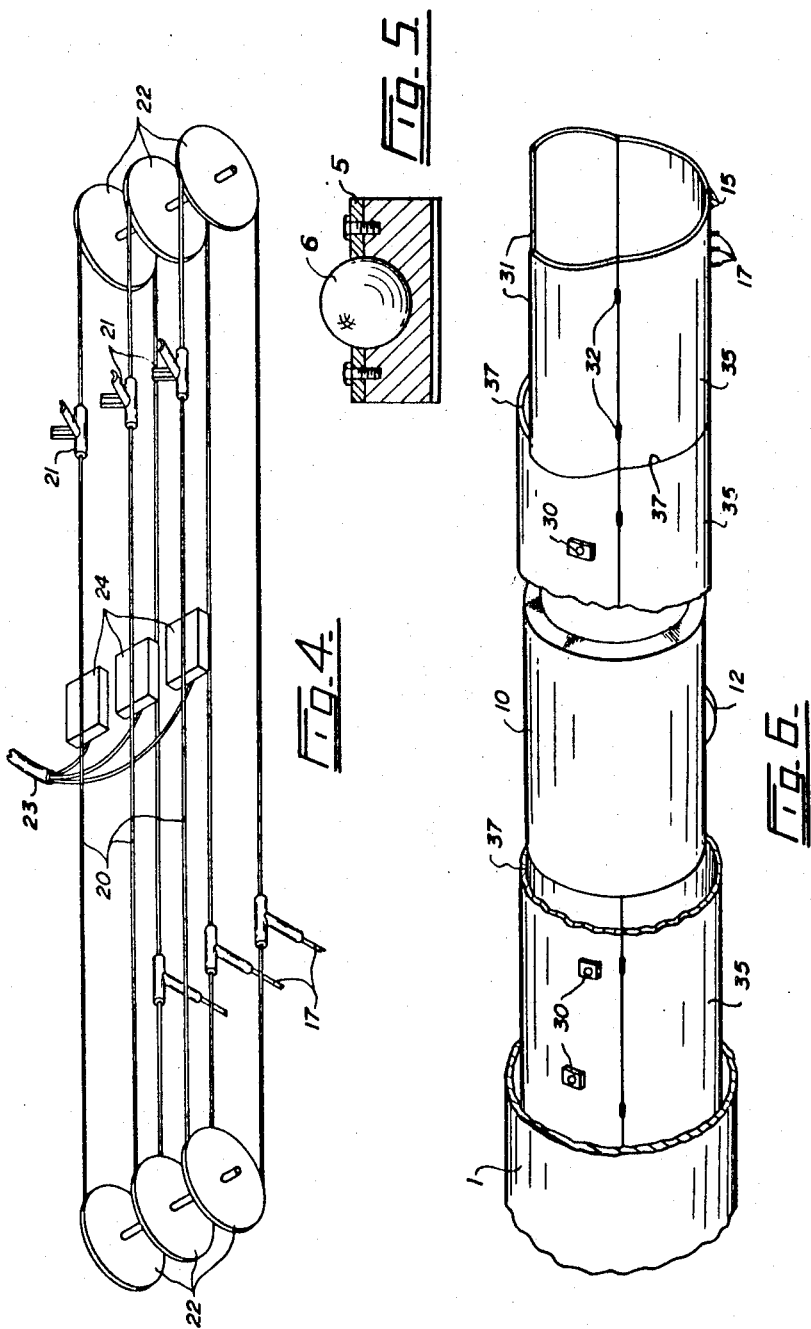

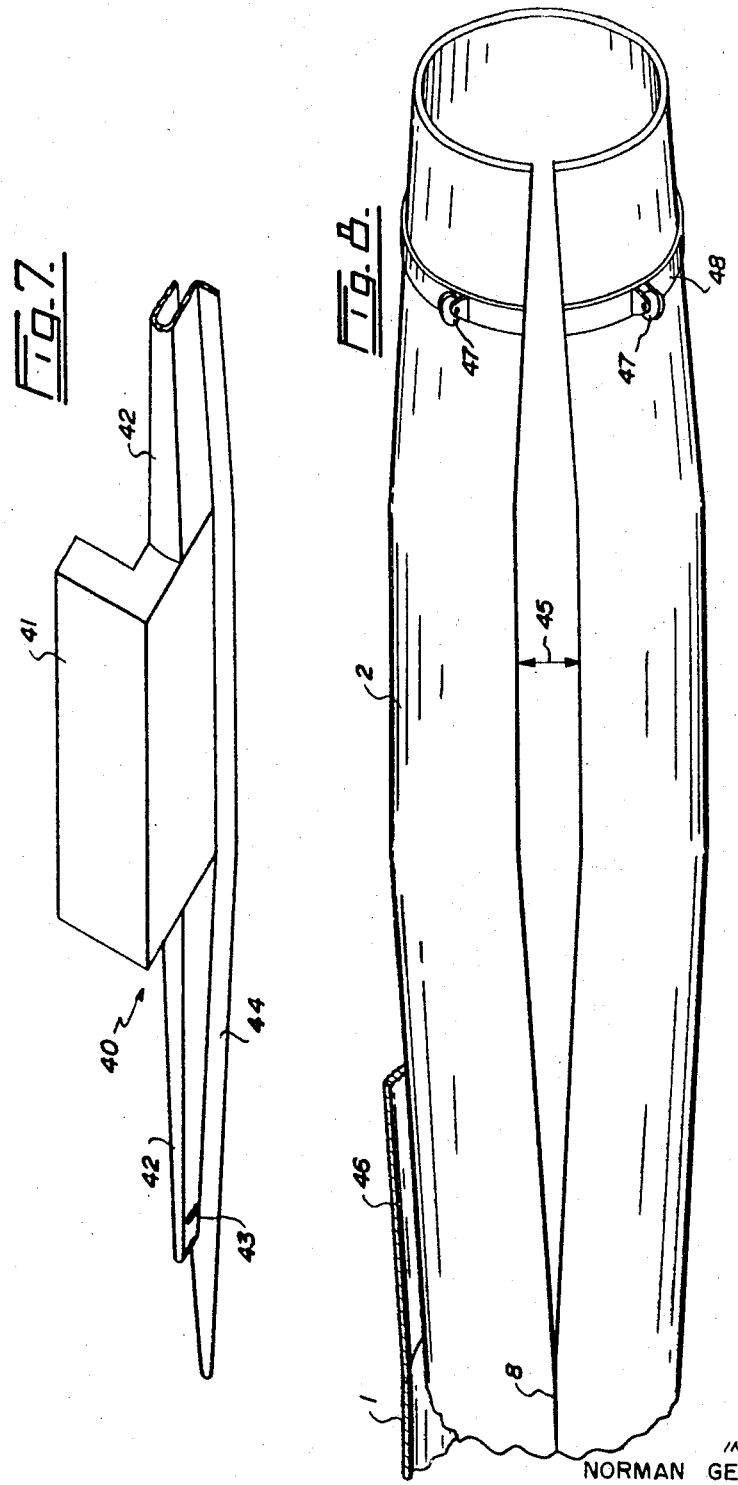

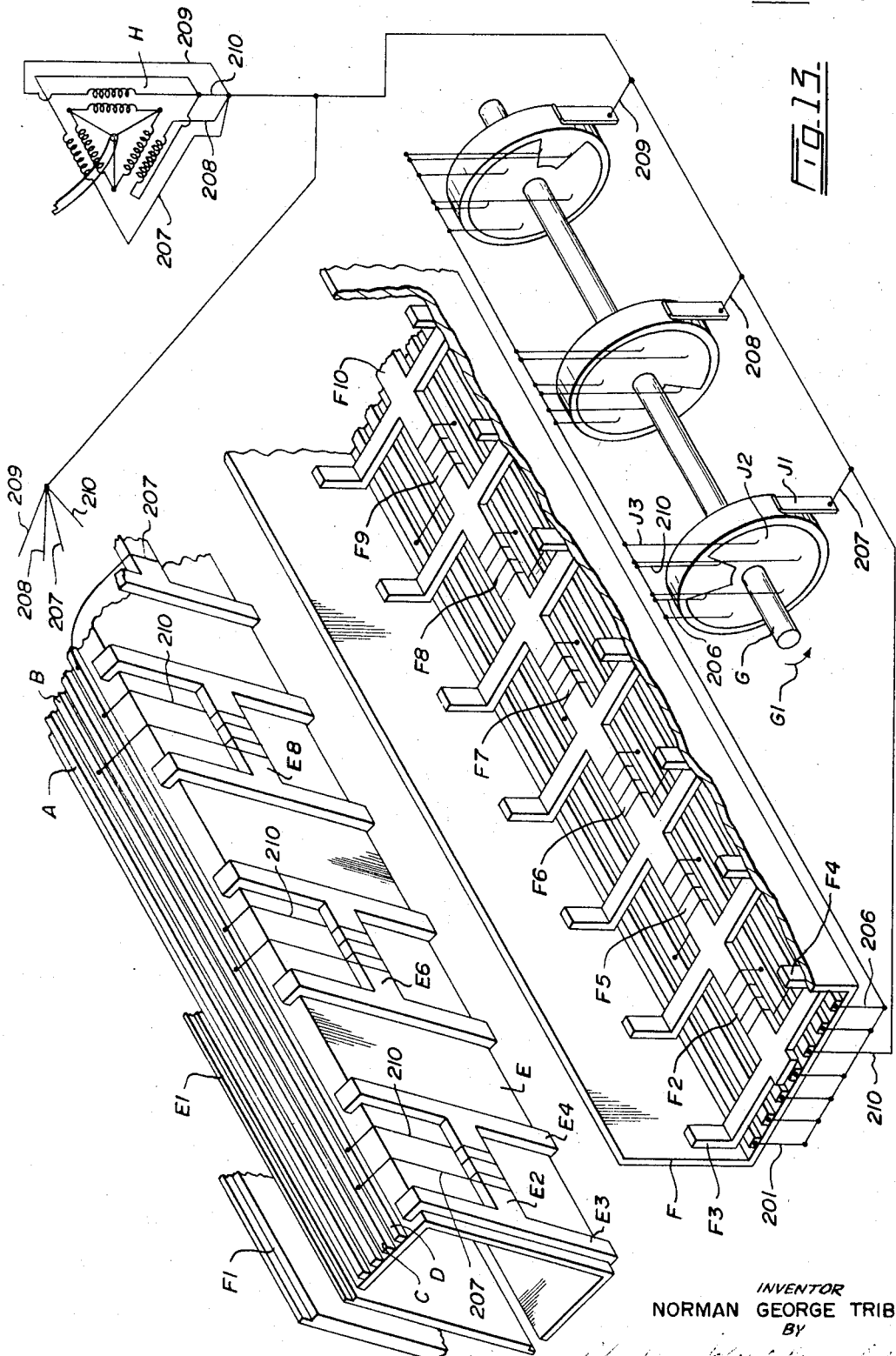

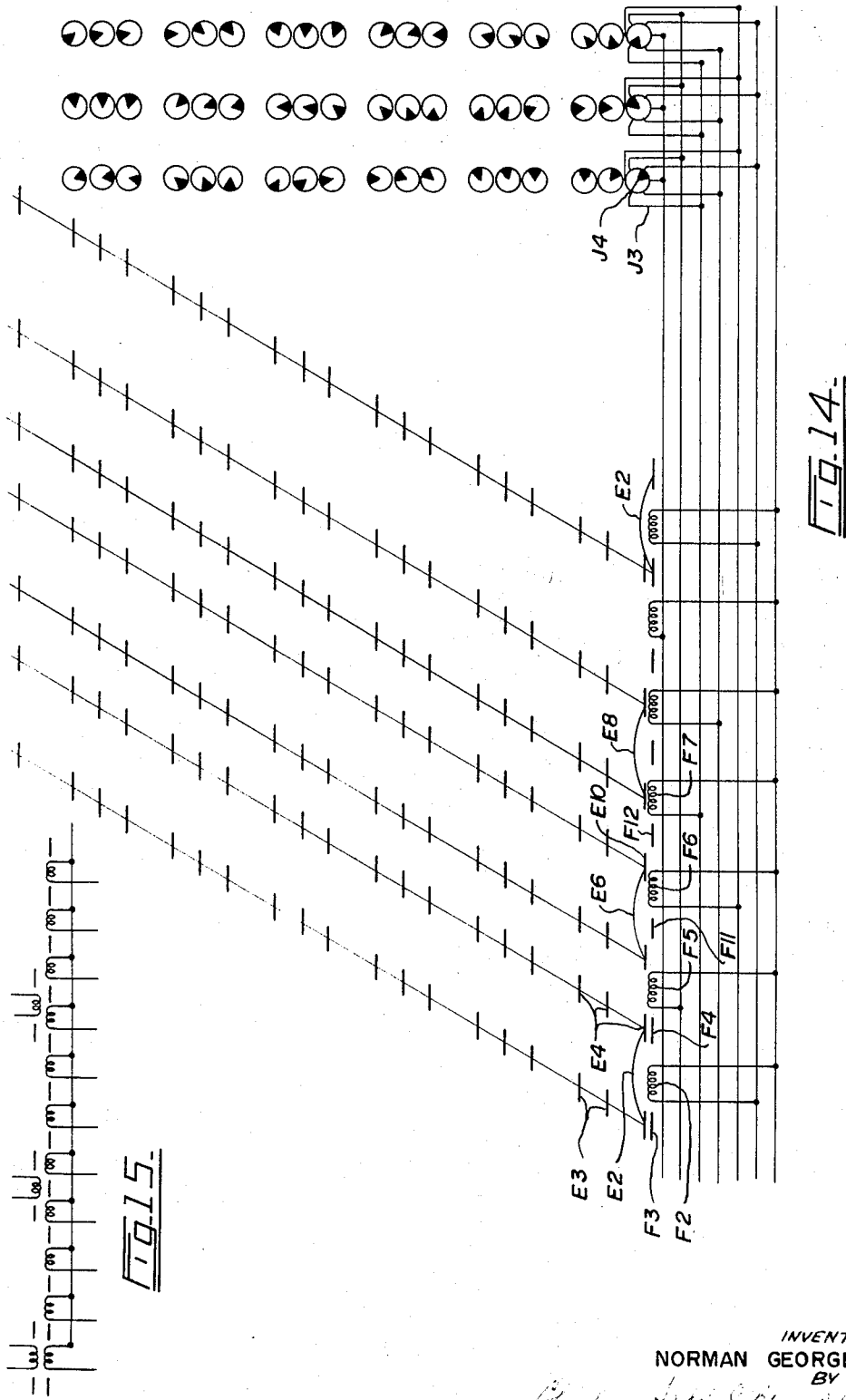

United States Patent Office 3,443,677
Patented May 13, 1969

3,443,677
CONVEYOR SYSTEM FOR MOVING SOLIDS OVER LONG DISTANCES
Norman G. Tribe, 5203 109A Ave., Edmonton, Alberta, Canada
Continuation-in-part of application Ser. No. 529,571, Feb. 23, 1966. This application Oct. 30, 1967, Ser. No. 679,096
Int. Cl. B65g *15/00;* H02k *41/00*
U.S. Cl. 198—184                                    11 Claims

ABSTRACT OF THE DISCLOSURE

A conveyor system comprising a rigid carrier pipe with a movable conveyor within it adapted for opening to receive a load and closing to protect the load during transit, drive means, such as an electric motor operating a driving wheel or a system of mutually repelling electromagnetic coils on the pipe and conveyor, being supplied from a succession of electrical supply locations spaced along the pipe.

---

This application is a continuation-in-part of my earlier application Ser. No. 529,571, filed on Feb. 23, 1966, now Patent No. 3,358,812.

This invention relates to a conveyor system for moving solids over large distances.

There is a great demand for improved systems for moving products such as coal, wheat, etc., over large distances by means of pipelines. Coal has been transported through pipelines as a slurry in water, but this creates pumping problems and also involves the added expense of drying the coal when it reaches its destination. It also has the disadvantage that a large amount of water must be transported with the coal in the pipeline.

The slurry system is, of course, not satisfactory for shipping materials such as wheat and some attempts have been made to transport materials of this type, which would be damaged by water or oil, in sealed capsules, these capsules being carried along in the pipeline suspended in a liquid such as petroleum oil. This system also has pumping problems as well as the very great problem that any leakage in the capsule will contaminate the cargo in the capsule.

The transportation system according to this invention overcomes the above disadvantages in moving solid materials by pipeline by providing a completely mechanical and electrical system involving no fluid flow. The system of the invention includes a series of open end containers which connect together to form a continuous conveyor of any desired length within a pipeline or carrier pipe. Each of these containers is arranged to be opened along its entire length so that when the containers are connected together they form a continuous conveyor which can be continuously opened and closed. The containers can be either square or rounded depending on the shape of the pipe in which they are carried and can be made from a rigid or relatively flexible material. When a flexible material is used, a rigid framework is necessary to support each container.

In some embodiments of the invention, the containers can be carried on rollers positioned within the pipeline or each container may have wheels or rollers which roll on the interior surface of the carrier pipe. It is also possible to support the containers without wheels or rollers by coating sliding surfaces on the outside of the container and the inside surface of the pipeline with a self-lubricating plastic such as Teflon. As will be made more clear below, it is possible also to use electromagnetic repulsion to support the conveyor, or at least to minimize wear on other, mechanical, supports.

The propulsion system for the conveyor is a series of electric drive units. These may take the form of a series of units positioned at regular intervals within the conveyor, e.g. up to several hundred feet apart. In these cases each drive unit is in the form of a closed capsule which fits within a container and consists of an electric motor and a drive wheel or electrically powered compressor supply compressed air to air jets. The drive wheel projects through an opening in the capsule and the container and engages the inside wall of the pipe carrying the conveyor. Power is supplied to the motors by means of a special electrical circuits as described later in this specification.

In other instances, the drive units may comprise, in general terms, stationary metal members in or on the support and cooperating metal members in association with the conveyor, an electrical current being supplied to create a like magnetic charge between the two sets of members so that the repulsion between them moves the conveyor in relation to its supporting carrier, or an unlike charge so that attraction fulfils the same purpose, or in some cases a combination of the two.

Conveniently, the supply of current is a three-phase supply which can readily be split and supplied to a suitable set of spaced metal members to provide constant movement of the conveyor.

Material may be loaded into the conveyor by means of a loading chute which continuously enters the conveyor by spreading a continuous longitudinal slit in the conveyor. Alternatively in certain embodiments the conveyor may be provided with a removable lid. The material is preferably unloaded by means of a suction probe which continuously enters the conveyor in the same manner as the loading chute.

With the system of this invention, it is particularly desirable to use tandem pipelines or a closed loop so that the conveyor can return from one loading and unloading station to another in either empty or full condition.

The invention will now be illustrated by reference to the attached drawings in which:

FIG. 1 is a perspective view of the conveyor system with broken-away sections showing internal portions of the device;

FIG. 2 is a sectional view through line 2—2 of FIG. 1;

FIG. 3 is a sectional view through line 3—3 of FIG. 1;

Figure 9:
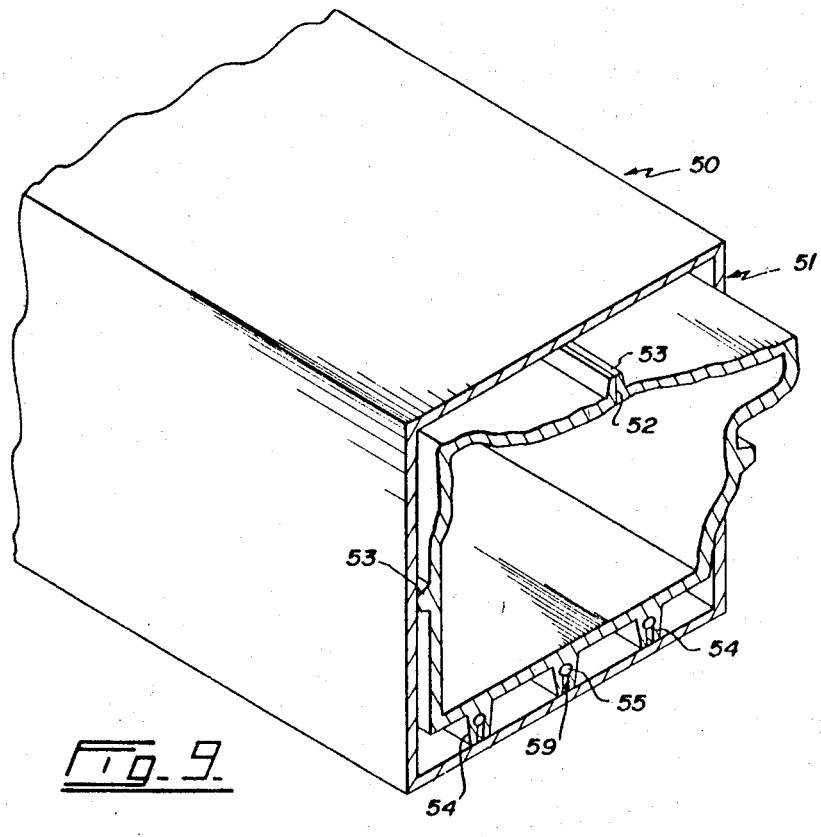
Figure 10:
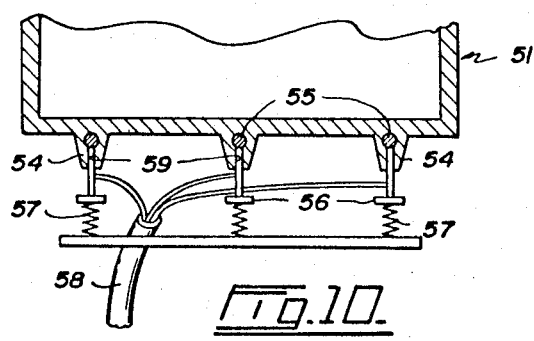

FIG. 4 schematically illustrates a system for supplying electric power to the motor capsule;

FIG. 5 is a detail sectional view of a guiding ball mount for the conveyors;

FIG. 6 is a perspective view of the conveyor system showing a door mechanism for loading and unloading;

FIG. 7 is a perspective view of a loading mechanism;

FIG. 8 is a perspective view of the conveyor with the longitudinal joint spread to pass the loading mechanism;

FIG. 9 is a perspective view of the conveyor system showing sliding supports; and FIG. 10 is a sectional view showing an alternative power supply system.

Figure 11:
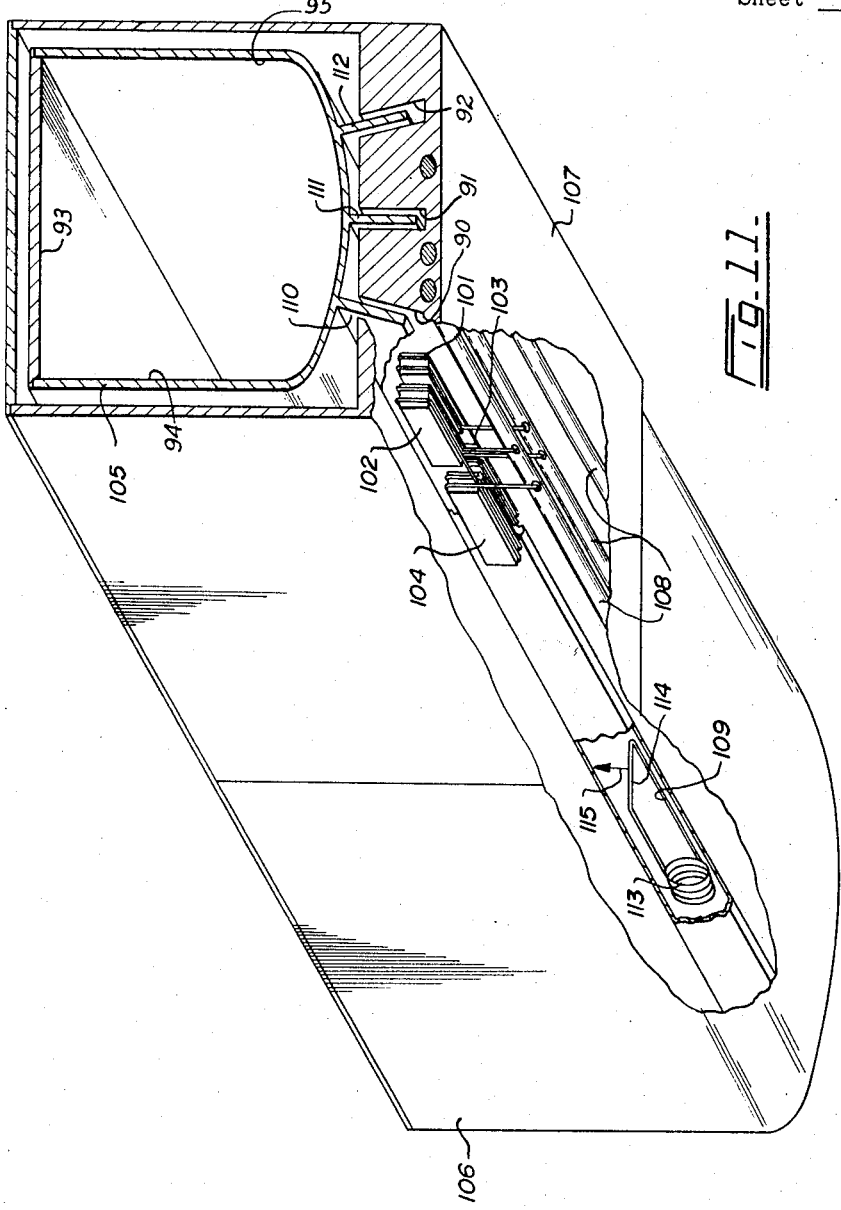

FIG. 11 is a perspective view of a further embodiment of the conveyor, showing an alternative form and location of drive, and a preferred shape and form of opening of the conveyor to be utilised with such a drive.

Figure 12:
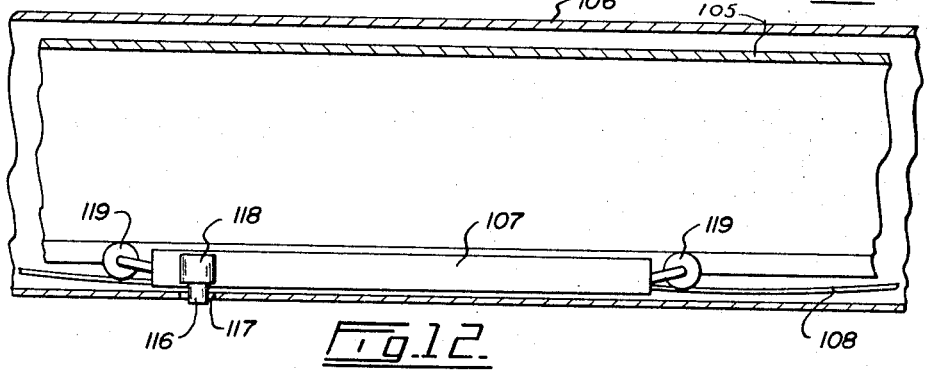

FIG. 12 shows a diagrammatic longitudinal section through a variant of the embodiment of FIG. 11.

FIG. 13 shows in an exploded and composite perspective view a yet further form of drive using the principle of electromagnetic attraction and repulsion.

Figure 13A:
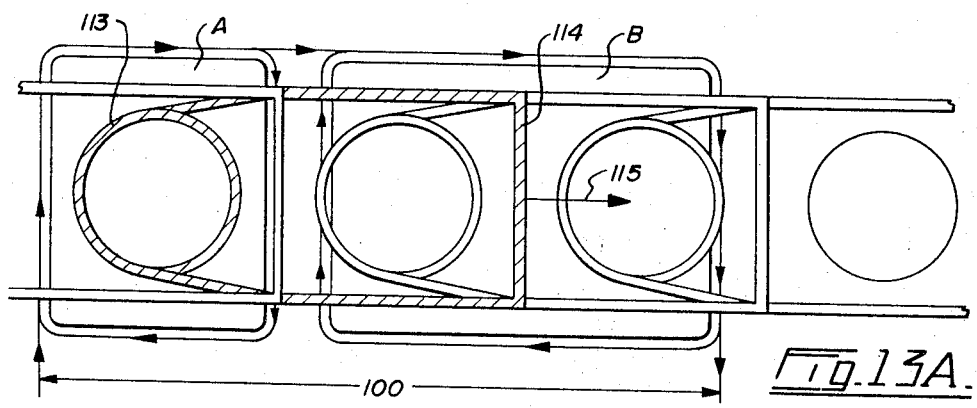
Figure 13B:
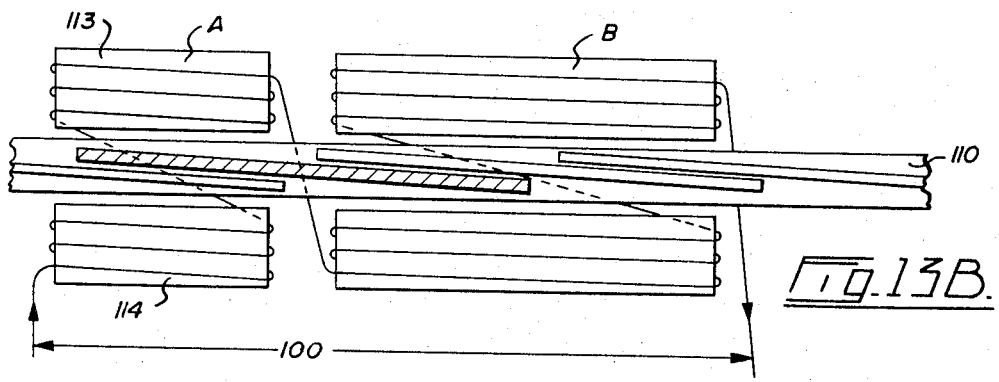

FIGS. 13a and 13b show details of the coil windings of FIG. 13 in side view and top view respectively.

FIG. 14 shows the sequence in which the electrical charges are distributed in the embodiment of FIG. 13.

FIG. 15 shows a variant form in which the electrical current may be supplied.

In the embodiment of the invention illustrated in FIGS. 1, 2, and 3, a pipeline 1 is shown with broken-away sections exposing a tubular conveyor 2. The conveyor 2 is preferably made from a reinforced plastic which has some flexibility and is formed in sections joined at joints 19 by means of locking devices 4. Conveyor 2 is supported on a rigid arcuate support 3 and has a longitudinal joint 8 which can be opened and closed for loading and unloading the conveyor. The longitudinal joint is held closed by means of latches 9. Rotatable balls 6 and ball mounts 5 serve as guides for positioning the conveyor 2 in the pipeline 1.

A broken-away section in conveyor 2 reveals a motor capsule 10 positioned within the conveyor. A still further broken-away section in capsule 10 shows a motor 11 which drives a drive-wheel 12. The drive-wheel 12 passes through a hole 13 in the capsule, conveyor and support and contacts the bottom of pipeline 1, providing the driving force for the conveyor. Motor capsules of this type are positioned at regular intervals along the conveyor with load carrying areas 7 between capsules. A series of idler wheels similar to the drive wheels can also be provided to support the conveyor between the drive wheels.

Electric current is supplied to motor 11 by electric cable 14 which is connected to three insulated electric wires 15 fixed on the conveyor. The electric wires 15 are joined together at each conveyor joint 19 by means of connector 16. Fixed contacts 17 project from lines 15 and contact moving electrical lines as shown in FIG. 4.

A series of power supply stations are provided along the pipeline for supplying electric power to the contacts 17 and the main components of such a power system is shown in FIG. 4. Each power supply station includes a series of moving wires 20 on which there are clamp type contactors 21 which are arranged to engage the contacts 17 as they pass the station. The contactors 21 are positioned such that the distance during which contactors 21 are engaged with contacts 17 is slightly greater than the distance between contacts 17 so that there is no interruption in the supply of electric power to the motor. Each wire 20 moves in a closed loop around insulated pulleys 22 and power is supplied to the moving wires by means of power cables 23 and sliding contacts 24.

In the arrangement shown in FIG. 6, the carrier pipe 1 carries within it a conveyor pipe consisting of rigid segments 35 connected together by connector joints 37. These rigid segments 35 are made from sheet metal or reinforced plastic and are provided with openable doors 31 mounted on hinges 32. A series of ball mounts 30 are also provided on the conveyor to position it within the carrier pipe 1.

A broken-away section is once again shown in this drawing, revealing motor capsule 10 with the projecting drive wheel 12 and the electrical contacts 15. This motor capsule is driven in the same manner as the capsule shown in FIG. 1.

The doors 31 can be opened by means of a spreading device which continuously engages the joint 37 between the two doors or projections may be provided on the outside of the doors which engage a spreading device. After loading, the doors are closed by providing a tapered portion in the carrier pipe which gradually reduces in diameter down to the diameter of carrier pipe which carries the conveyor in closed position. The doors 31 are maintained in closed position between loading and unloading stations by means of ball mounts 30 which maintain a close contact with the interior surface of the carrier pipe.

FIGURE 7 shows a loading chute 40 having a hopper 41. A longitudinally tapering projection 42 is fixed to the outlet of hopper 41 and serves to spread open the longitudinal slit in the conveyor. Rollers 43 can be provided adjacent the forward end of the spreader 42 to aid in the spreading open of the longitudinal slit. The edge of the spreader 42 remote from the hopper 41 has a longitudinally extending flange 44 fixed thereto. This flange travels inside the conveyor and seals the edges of the longitudinal opening in the conveyor as it spreads to pass around the spreader 42, thus preventing material from spilling out of the conveyor as it is being fed in through the loading chute. The flange 44 is made quite thin so that it projects only a short distance into the conveyor and is able to pass the motor capsules without interference.

FIGURE 8 shows the manner in which a flexible conveyor segment 2 spreads open as it passes the loader of FIGURE 7. Thus it will be seen that the longitudinal slit 8 is spread the distance shown by the numeral 45 as it passes the loader. It will also be noted that the carrier pipe 1 is provided with an expanded section 46 to accommodate the conveyor when spread open.

In this embodiment the segments of the conveyor are supported and positioned within the carrier pipe by means of support wheels 47 mounted on annular mounting 48.

FIGURE 9 shows yet another embodiment of the invention in which a carrier pipe and conveyor of rectangular cross-section are used. Carrier pipe 50 contains a conveyor 51 having a continuous longitudinal slit 52 for loading and unloading material. The top and side walls of the conveyor 51 have projections 53 which position the conveyor 51 in the pipe 50 while the bottom wall of the conveyor 51 is provided with a series of projections 54 on which the conveyor 51 slides. The projections 53 and 54 can run continuously along the conveyor or they may be in the form of intermittent lengths.

In order that the conveyor will slide easily in the carrier pipe, the surfaces of the projections as well as the interior surfaces of the carrier pipe are coated with a self-lubricating plastic, such as Teflon. This plastic coating is particularly important for the projections 54 which support the conveyor.

The conveyor 51 is propelled by a motor capsule as described hereinbefore and electrical power is supplied by the system as shown in FIGURE 10. Bare electrical wires 55 are imbedded in the projections 54 with slots 59 providing continuous openings to the wires. The material in which the wires are imbedded is, of course, an insulating material.

A series of sliding contacts 56 supported by springs 57 are provided at periodic points along the pipeline and contact the wires 55, providing current to them from the electrical cable 58.

Granular or powdered material can be conveniently unloaded from the conveyor by means of a suction probe which continuously spreads the longitudinal slot and extends down to the bottom of the conveyor. The suction probe is movable in a vertical direction and guide tracks are provided at each motor capsule which raise the probe to pass over each capsule.

It will also be appreciated that this device can be adapted for the transportation of packages or individual objects by modifying the loading and unloading mechanisms. Thus packages or articles can be loaded by means of a chute extending into the continuously opened conveyor while they can be unloaded by means of a conveyor belt continuously extending into a continuously opened conveyor.

The embodiment shown in FIGS. 11 and 12 utilizes two of the fundamental laws of electricity. These are:

(1) When a conductor carrying a current lies in a magnetic field a force is exerted upon the conductor, tending to move it at right angles to the direction of the current and of the magnetic lines.

(2) A change of current in an electric circuit produces a change in the magnetic field around it, and the accompanying change in flux sets up a voltage in any circuit linked to the flux.

Referring to the enclosed sketch, a conveyor 105 lies within the pipe 106. Item 107 is a new feature which is a power section in the pipe 106. This can be made integral with the pipe or as a separate unit, and a plurality of such power sections are spaced as required at intervals along the pipe 106. The main 3 phase power supply cables are shown as 108. If the power sections are made as separate units, the pipe, 106, can be cut and the power section, 107, inserted. Thus the power section can be manufactured at a plant and shipped to the installation site. Also the pipe could be plant-manufactured and shipped to the installation site. In the illustrated embodiment the power section is shown as having a square bottom and three longitudinal grooves 90, 91 and 92 in the surface presented to conveyor 105, and the conveyor is shown as having a rounded bottom with a flat removable lid 93 for closing edge walls or portions 94 and 95. The pipe also has a rounded bottom. The conveyor has three ribs or flanges, longitudinally along the bottom, 110, 111, and 112 which are adapted to ride in longitudinal grooves 90, 91 and 92.

In describing the principle of this method one phase and one flange, will be studied. The other two phases and flanges are identical. Carried on each flange are a series of wire loops, one of which is shown as item 109. These wire loops are evenly spaced, overlap one another along the flange, and are attached firmly to the flange.

Attached firmly in the power section are two sets of coils, 101, 102, and 103, 104, which when energized will produce two magnetic fields. Coils 103, 104 are wound with sufficient turns and in such a direction to produce a magnetic field of such strength and direction that a voltage and current will be induced in wire loop, 109. This induction takes place due to the above quoted law (2).

The magnitude and direction of the current produced will be proportional to the number of turns and direction of winding in coil 113.

At the time coil 113 is passing through the field produced by coil 103 and 104 the other end 114 of loop 109 is passing through a magnetic field produced by coils 101 and 102. Coils 101 and 102 are wound with sufficient turns and in such a direction as to produce a force on the conductor 114 which is carrying the current produced by 113. This force is created due to the above quoted law No. 1. The force will be in the direction of arrow 115. The magnitude of the force will be such that it will lift the conveyor off the inside bottom of the pipe and move it through the pipe.

These features can be more clearly seen from FIGS. 13a and 13b.

When alternating power is applied at the single phase terminal shown as 100 on the accompanying sketch, the magnetic fields A and B are created due to the effect of a current passing through a coil. These fields are continuously reversing direction as well as increasing and decreasing in intensity due to the alternating power supply. As previously mentioned a voltage will be produced in any conductor that is in a changing flux or magnetic field, such as that produced by an alternating current. The conductor in this case is, for example coil 113 in magnetic field A and the intensity of the voltage produced is proportional to the number of turns on the coil.

The circuit from the conductor coil, 113 is completed through a further conductor, 114 which is in magnetic field B. In this particular instance conductor 114 is shown as being vertical; certain advantages may accrue from its being at an angle to the vertical (see FIG. 13) and these advantages are discussed below. As previously mentioned a force 115 will be exerted on this conductor when a current is passing through it and it is in a magnetic field.

The conductors 113 and 114 are repeated at regular intervals along the flange, 110 which is part of the conveyor, 105. This forces the conveyor to move relative to the magnetic field. As the same current produces both fields the timing of the peak conductor current dependent on field A and the peak magnetic field intensity depending on field B acting on it will always occur at the same time, as will the valley. A force fill be continuously applied if 3-phase power is used.

If the conductor, 114p is at an angle to, or even approaches, the horizontal a portion of the force, 115p will apply vertically, thus tending to lift the conveyor, 105. It is conceivable that the conveyor 105p, could "float" inside of the pipe, 106.

If the force required to lift the conveyor is uneconomically large, rollers or sliding surfaces on the conveyor or in the power sections may be provided and the force needed will only have to be large enough to overcome the force of friction.

The flanges 110, 111, 112, will strengthen the bottom of the conveyor so that it will remain relatively rigid between power sections. The flanges must not be too large, since the conveyor must bend to change elevation. Such bending will however be on a very large radius. Flanges 110 and 112 are slanted slightly outward at the bottom so that the force acting on the conductor will tend to keep the conveyor centered in the pipe.

An added feature of this system is that the conveyor does not necessarily have to be continuous but could be made up of many closed end independent sections providing that they are long enough to always be over two power sections.

FIG. 12 is a longitudinal section showing another method of installing the power section. In this case the power section is free to move inside the pipe except that it may be held stationary in a number of set locations by a pin 116 which is inserted through a hole 117 in the pipe. The pin is spring-loaded to keep it in the hole. It however, can be removed from the hole when necessary by energizing a solenoid, 118, attached firmly to the power section. When the pin 116 is temporarily removed, the force applied by the power section to the conveyor can be used to slide the power section along inside the pipe, rolling along support wheels 119. In this way the power sections can be moved along the pipe for removal one at a time for maintenance. The holes are spaced at regular intervals along the pipe. The spacing is dependent upon the power requirements in that section of the pipe, such as up-hill, down-hill or level operation.

Also shown in FIG. 12 are two rollers, 119 on which the conveyor is supported thus eliminating the need for the power section to lift the conveyor completely. The rollers can also be maintained when the power section is removed.

The system shown in FIGS. 13, 14 and 15 employs the principles of magnetic attraction of unlike polarities and repulsion of like polarities to apply both a lifting and a horizontal force to the conveyor.

The attraction of unlike charges is used to assist in moving the conveyor relative to the pipe. The repulsion of like charges is used to assist in moving the conveyor relative to the pipe as well as in lifting the conveyor relative to the pipe to maintain a small clearance between the conveyor and the pipe. This clearance will tend to minimize the friction losses between the conveyor and the pipe as the conveyor moves along, and thus eliminate considerable wear on both. In effect the conveyor will be riding on a magnetic field.

The charges are changed as necessary in order that the repulsion and attraction can be altered to obtain a final force acting upon the conveyor that separates it from the pipe and move the conveyor steadily in one direction. The charges are changed by passing a three phase current through a separately rotated distributor which distributes the current to various coils which are spaced along the inside bottom of the pipe and the outside bottom of the conveyor. These coils produce magnetic fields that either repel or attract as necessary.

Referring to FIG. 13, item E is the bottom and 2 sides, of the conveyor and item $E_1$ is the top. Top $E_1$ is a flat removable lid for closing the two sides or edge portions of item E. In this embodiment the filling arrangement is shown as a full opening with a top that can be removed, since the manufacture of the conveyor and pipe could be accomplished more readily with this type of construction in this form.

Item F is the bottom and 2 sides of the pipe and $F_1$ is the top of the pipe.

A distributor G rotates in the direction shown by arrow $G_1$.

Item H is a transformer bank with a Y-connected secondary.

For simplicity the circuit of one phase only will be traced and explained. The other phases are similar except for being 120° earlier or later.

Starting at the secondary of the transformer, phase one is carried through wire 207 and is split 2 ways, one to the conveyor and the other to the pipe. The current to the conveyor is carried through sliding contacts C on the side of the conveyor to a horizontal coil E-2 installed lengthwise on the outside bottom of the conveyor. This coil has a metallic core which is H-shaped and the two ends E-3 and E-4 tie across the bottom and up the sides of the conveyor. As the current passes through the coil E-2, the ends of the core (E-3, E-4), are negatively or positively charged depending upon the momentary direction of the alternating current in phase 1. The circuit is completed through wire 210 through sliding contact D to the common ground.

(It will be appreciated that in the same way wire 208 is connected to sliding contact B and 209 to contact A.)

The current to the pipe is carried through sliding contact J-1 to a distributor wheel J-2. The outer rim and a segment of the center portion of the distributor wheel are made of material that is a conductor of electricity. The remainder of the centre portion is made of a material that is a non-conductor. (The distributor is schematic only as many forms of distributors are available, as are relay sequences that have very few moving parts. It is used only as an exemple to show one form of the complete circuitry required to be able to make a travelling magnetic field along the pipe.) The outer rim makes contact with sliding contact J-1 and thus energizes the smaller inside segment of the wheel. This segment in turn energizes 6 sliding contacts, similar to J-3, in rotation. The current is thus distributed in turn to six of seven wires attached to the pipe. In the case shown the current in wire 207 is distributed to wire 206 which in turn engergizes coil F-2, mounted lengthwise on the bottom of the pipe. Similarly to E-2, the coil F-2 has a metallic core which is H-shaped and the two ends, F-3 and F-4, are across the bottom and up the sides of the inside of the pipe. As the current passes through the coil the ends of the core, F-3 and F-4, are negatively or positively charged depending upon the direction of the alternating current in phase 201. The circuit is completed through wire 210 to the common ground.

As the distributor rotates, coils F-5 to F-9 are energized by phase 201 in rotation and at coil F-10 the sequence starts to repeat.

The conveyor E is free to move relative to the pipe F and thus the attraction and repulsion of the charges on E-3 and E-4 and F-3 and F-4 will tend to move the conveyor vertically and horizontally relative to the pipe.

When coil E-2 is directly above coil F-2 the current flow in the coils is such as to produce like charges in E-3 and F-3 and E-4 and F-4 thus repelling and lifting the conveyor off the pipe.

Coils E-2, E-6 and E-8 have a smaller distance between them than the spacing between F-2, F-6 and F-8. The reason for this is that as coil E-2 is directly over F-2 applying a vertical force only, coils E-6 and E-8 are only approaching F-6 and F-8 and are applying a near horizontal force to the conveyor.

After E-2 has passed over F-2 the repulsion of the charges will still exist. However it will then tend to force the conveyor along as well as lift. As coil E-2 approaches coil F-5 there will be an attraction to move the conveyor along but also a tendency to reduce the clearance between the pipe and the conveyor. The distributor is therefore timed to change phase 201 from coil F-2 to F-5 to minimize the attraction when the force is mainly vertical after it has been used to assist in applying the horizontal force. The change will occur just before E-2 passes over F-5. As phase 1 is now applied to both F-5 and E-2 the cycle will start again. This is repeated again in coils F-6 to F-9 inclusive.

It can be seen that all the forces will not be applied in the same direction and thus the conveyor will be "locked-in" on the magnetic field in the pipe.

Sketch 2 shows diagrammatically the various positions of the moving coil relative to the stationary coils during one revolution of the distributor J. The vertical co-ordinate is shown as time only and does not represent distance. The clearance between the moving coil and the stationary coil remains constant. The horizontal co-ordinate is shown as distance. If the vertical co-ordinate is measured in seconds and the horizontal co-ordinate in feet the speed of the moving coil would be ft. per sec. The horizontal spacing of the coils is fixed at the time of manufacture and thus can not be altered to change the speed. The vertical spacing of the time element however can be altered by changing the r.p.m. of the distributor to move the travelling magnetic field along at a higher rate. Therefore the speed of the conveyor can be controlled by controlling the speed of the distributor.

The distributor in actual fact creates a travelling magnetic field along the bottom of the pipe which repels and to a lesser degree attracts the magnetic field created on the bottom of the conveyor thus forcing the conveyor to lift and travel with it.

As phase 1 energizes both E-2 and F-2 simultaneously, the core end E-3 and E-4 will repel F-3 and F-4 respectively thus lifting the conveyor clear of the pipe. Coils E-6 and F-5 are energized by phase 2 in a like manner and the core ends repel and to a lesser degree attract; however the force exerted is primarily horizontal. The repelling force (F-4 to E-9, F-11 to E-10) is in the same direction as the attracting force (E-9 to F-11, E-10 to F-12) and the forces are thus additive. At times they may not be in the same direction and are then subtractive. At times the resultant force may momentarily even be in the reverse direction to the overall force. If the conveyor tended to travel faster than the distributor changed the energizing of the stationary coils the force in the reverse direction would increase and slow the conveyor down. This locks the field of the coils in motion onto the travelling field in the stationary coils.

F-4 could momentarily be charged by 2 coils, phase 1 in F-2 and phase 2 in F-5, and thus the charge may or may not be neutralized depending upon the direction of current flow in the coils. Also it can be seen that phase 2 current is about to be changed from coil F-5 to coil F-6 at which time F-12 could be momentarily charged by 2 coils.

The distributor must, therefore, be set to minimize this double charging as well as make the change from attraction to repulsion at the point where attraction becomes more vertical than horizontal.

The double charging in the core ends could be eliminated by doubling the number of stationary coils and having more idle coil ends. This is a more expensive construction but is shown sketched in at the top left hand corner of FIG. 15. The distributor would require 12 points per revolution instead of 6.

I claim:

1. A device for continuously transporting solid material over long distances comprising in combination
   a rigid, generally closed carrier pipe having a plurality of openings therein for loading and unloading said solid material;
   conveyor means disposed within and adapted to travel along said carrier pipe, said conveyor means having a lower portion including downward extension means, edge portions and means for closing said edge portions to form a closed, generally tubular container;
   drive means including a plurality of power units disposed in spaced relationship along said carrier pipe, each of said power units including first electromagnetic coil means, and means for supplying electricity to said power units;
   said conveyor means having a length at least equal to the space between two of said power units; and
   said downward extension means of said lower portion of said conveyor means including second electromagnetic coil means and being disposed in close proximity to said first electromagnetic coil means whereby said conveyor means is lifted and caused to travel along said carrier pipe due to the electromagnetic interaction between said first and second electromagnetic coil means when electricity is supplied to said power units.

2. The invention as recited in claim 1 wherein said downward extension means include longitudinal ribs extending from said lower portion of said conveyor means, and each of said power units includes longitudinal grooves for receiving said longitudinal ribs.

3. A device as recited in claim 2 wherein said drive means includes locking means for mechanically locking said power units to said carrier pipe and means for releasing said locking means whereby said power units are movable along said carrier pipe when electricity is supplied to said power units.

4. The device as recited in claim 1 wherein said conveyor means includes an endless conveyor and said means for closing said edge portions includes a flat removable lid.

5. The device as recited in claim 1 wherein said first electromagnetic coil means includes a plurality of spaced first electromagnetic coils; and said second electromagnetic coil means includes a wound portion for generating an induced voltage when in proximity to one of said first electromagnetic coils, and a forwardly extending portion spaced from said wound portion to be in proximity to another of said first electromagnetic coils to experience electromagnetic attraction or repulsion simultaneously with the generating of the induced voltage by said wound portion.

6. A device as claimed in claim 5 wherein said forwardly extending portion includes an electrically conductive part extending at an angle to the vertical whereby both a horizontal and vertical component of force is exerted upon it.

7. A device for continuously transporting solid material over long distances comprising in combination
   a rigid, generally closed carrier pipe having a plurality of openings therein for loading and unloading said solid material;
   conveyor means disposed within and adapted to travel along said carrier pipe, said conveyor means having a lower portion, edge portions and means for closing said edge portions to form a closed, generally tubular container;
   drive means including a plurality of first electromagnetic coils disposed along said carrier pipe, a plurality of second electromagnetic coils disposed along said lower portion of said conveyor means, sliding electrical contact means connected with said second electromagnetic coils and means for supplying three-phase electricity to said second electromagnetic coils through said contact means and to said first electromagnetic coils to generate an electromagnetic force having a horizontal component and a vertical component to drive said conveyor means along said carrier pipe.

8. The device as recited in claim 7 wherein said drive means includes a rotary distributor for distributing said three-phase electricity to said first and second electromagnetic coils.

9. The device as recited in claim 7 wherein said second electromagnetic coils are more closely spaced than said first electromagnetic coils.

10. The device as recited in claim 7 wherein said second electromagnetic coils are less closely spaced than said first electromagnetic coils.

11. The device as recited in claim 7 wherein said conveyor means includes an endless conveyor and said means for closing said end portions includes a flat removable lid.

References Cited

UNITED STATES PATENTS

| | | | |
|---|---|---|---|
| 3,225,228 | 12/1965 | Roshala | 310—12 |
| 3,358,812 | 12/1967 | Tribe | 198—184 |

RICHARD E. AEGERTER, Primary Examiner.

U.S. Cl. X.R.

310—12